(12) United States Patent
Segall

(10) Patent No.: US 8,427,583 B2
(45) Date of Patent: Apr. 23, 2013

(54) AUTOMATIC PARAMETER CONTROL FOR SPATIAL-TEMPORAL FILTER

(75) Inventor: Christopher A. Segall, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 174 days.

(21) Appl. No.: 12/894,591

(22) Filed: Sep. 30, 2010

(65) Prior Publication Data

US 2012/0081612 A1 Apr. 5, 2012

(51) Int. Cl.
*H04N 5/21* (2006.01)

(52) U.S. Cl.
USPC ........................................................ 348/607

(58) Field of Classification Search .................. 348/607, 348/609, 611, 618, 620, 624, 615, 699, 700; 382/254, 260
See application file for complete search history.

(56) References Cited

U.S. PATENT DOCUMENTS

| | | | |
|---|---|---|---|
| 5,802,481 A | 9/1998 | Prieto | |
| 5,974,181 A | 10/1999 | Prieto | |
| 6,005,626 A * | 12/1999 | Ding | 375/240.16 |
| 6,285,710 B1 * | 9/2001 | Hurst et al. | 375/240.12 |
| 6,957,147 B2 | 10/2005 | Baliguet et al. | |
| 7,145,607 B1 * | 12/2006 | Hui | 348/607 |
| 7,199,838 B2 * | 4/2007 | Lin et al. | 348/607 |
| 7,206,459 B2 | 4/2007 | Berkner et al. | |
| 7,266,246 B2 | 9/2007 | Shaked et al. | |
| 7,535,517 B2 * | 5/2009 | Zhou et al. | 348/701 |
| 7,769,089 B1 * | 8/2010 | Chou | 375/240.29 |
| 7,792,381 B2 * | 9/2010 | Rhee | 382/260 |
| 8,175,414 B2 * | 5/2012 | Hsu | 382/286 |
| 8,184,705 B2 * | 5/2012 | Lin | 375/240.16 |
| 2001/0019633 A1 * | 9/2001 | Tenze et al. | 382/261 |
| 2002/0028025 A1 * | 3/2002 | Hong | 382/260 |
| 2003/0086623 A1 | 5/2003 | Berkner et al. | |
| 2005/0105627 A1 * | 5/2005 | Sun et al. | 375/240.29 |
| 2005/0244061 A1 | 11/2005 | Shaked et al. | |
| 2007/0160304 A1 | 7/2007 | Berkner et al. | |
| 2007/0237241 A1 | 10/2007 | Ha et al. | |
| 2007/0280552 A1 | 12/2007 | Lee et al. | |
| 2008/0013847 A1 | 1/2008 | Li | |
| 2008/0247664 A1 | 10/2008 | Lee et al. | |

FOREIGN PATENT DOCUMENTS

| | | |
|---|---|---|
| EP | 0866617 A2 | 9/1998 |
| EP | 1282075 A2 | 2/2003 |
| JP | 11-069202 A | 3/1999 |
| JP | 2001-160909 A | 6/2001 |
| JP | 2003-348383 A | 12/2003 |
| JP | 2006-229749 A | 8/2006 |
| JP | 2010-171808 A | 8/2010 |
| WO | 2005111938 A2 | 11/2005 |

OTHER PUBLICATIONS

International Search Report, mailed Dec. 27, 2011, PCT/JP2011/072690, filed Sep. 26, 2011, Sharp Kabushiki Kaisha, 7 pgs.

* cited by examiner

*Primary Examiner* — Paulos M Natnael
(74) *Attorney, Agent, or Firm* — Chernoff Vilhauer McClung & Stenzel, LLP

(57) ABSTRACT

A method for image processing includes receiving an input image and estimating a noise characteristic of the input image, wherein the noise characteristic includes a temporal characteristic and a spatial characteristic. Spatially filtering the input image based upon the spatial characteristic, wherein the spatial characteristic is dependent upon the temporal characteristic.

5 Claims, 1 Drawing Sheet

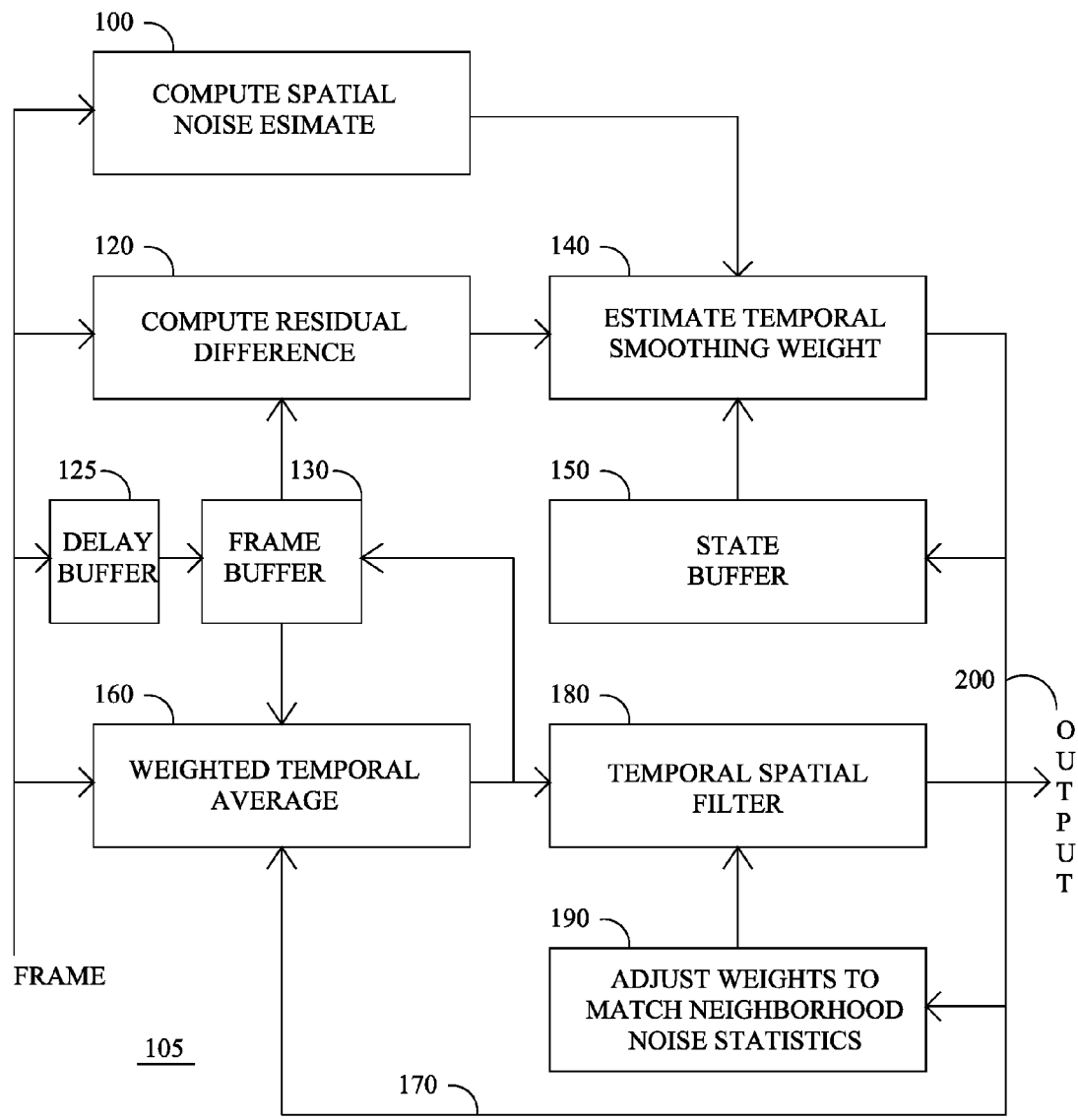

AUTOMATIC PARAMETER CONTROL FOR SPATIAL-TEMPORAL FILTER

CROSS-REFERENCE TO RELATED APPLICATIONS

None.

BACKGROUND OF THE INVENTION

The present invention relates generally to a spatial-temporal filter.

The quality of video sequences or a particular image varies widely depending on the source of the content. For example, computer generated content tends to have a high image quality. Packaged content, such as blue-ray media content, tends to have relatively high image quality. Over the air high definition broadcast content tends to have a somewhat lower image quality, while content distributed over cable and satellite tends to be of relatively lower image quality. In most cases, Internet protocol television (IPTV) and streamed content tends to be of even lower image quality.

It is desirable to include a system that is adaptable to different types of content and suitably applies a spatial temporal filter to increase image quality.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 1 illustrates the spatial-temporal filtering system.

DETAILED DESCRIPTION OF PREFERRED EMBODIMENT

While single frame based noise removal and image enhancement techniques can be generally effective, in the presence of substantial motion such techniques becomes less effective. Thus it is desirable to include a technique that is adaptable to motion between different frames to adjust parameters within the frame to reduce the noise and enhance the image.

Referring to FIG. 1, a frame (or portion thereof) 110 is received by the image enhancement system 105. The image enhancement system 105 then estimates the spatial-temporal noise and filters the input image accordingly. The input image is received by the compute spatial noise estimates function 100. The spatial noise estimate function 100 may use any suitable measure to provide an estimate of the noise in the input image 110. The output of the spatial noise estimate function 100 is an estimate of the noise in the input image 100.

The frame 110 is also received by the compute residual difference function 120. The compute residual difference function 120 determines a motion compensation estimate between the input frame 110 and a previous frame within the frame buffer 130. The residual difference function 120 provides a confidence estimation of the quality of the motion compensation between the frames. The comparison and processing of images herein may be based upon different regions of the images, different blocks of the images, or the image as a whole, as desired. In many cases, the motion compensation between frames is of high quality, while in other cases the motion compensation between frames is of lower quality. Thus, the confidence estimation provides an indication of the quality of the motion estimation. The residual difference function 120 may likewise use one or more of any previous or future frame, as desired.

The frame buffer 130 may receive the frame 110, and buffer it for later use. The frame buffer 130 may receive the frame 110 after being buffered by a delay buffer 125, typically delayed by one frame. The frame buffer 130 should also perform motion compensation on the frame prior to the data being provided to the compute residual difference module 120 and/or the weighted temporal average module 160. In this manner, the motion compensated current frame is available at other times, as needed.

The output of the spatial noise estimate function 100 and the residual difference function 120 are provided to an estimate temporal smoothing weight function 140. The temporal smoothing weight function 140 receives an indication of the quality of the motion estimation and how much noise is in the image. In combination, this information provides a further estimation of the confidence of the motion compensation. For example, if the noise is high and the motion estimation is only midrange, then the motion estimation is likely good. For example, if the noise is low and the motion estimation is high, then the motion estimation is likely not good.

The spatial noise estimate, the residual difference values, the noise estimate, (other data if desired), and data for an image corresponding to another time instance may be used to generate the temporal smoothing weight. This weight may be expressed in any suitable manner, such as for example, on a per frame manner, on a per block manner, or a per pixel resolution manner. The pixel values from the input frame and the frame from another time instance may be combined in a weighted combination, where the weight used is the temporal smoothing weight.

The state buffer 150 provides a filtered image at a previous time, such as T-1, to the temporal smoothing weight function 140. In this manner, the temporal smoothing weight 140 may likewise compare information related to the input image 110 and the previous filtered image. Using a measure of the noise in the filtered image of a previous frame facilitates the temporal smoothing weight function 140 to quantify how good the motion estimation is. The state buffer 150 may further use the temporal smoothing weights 140 to compute and/or estimate the noise in the filtered image. Thus the state buffer 150 may estimate the noise. In this manner, a further metric may be used to determine an estimation of the quality of the motion estimation.

The temporal smoothing weight function 140 may be represented by the value G which may be computed as, $$G(x,y,z)=R(x,y,z)/[R(x,y,z)+Q(x,y,z)]$$

where is R is the output of the spatial noise estimator and Q is the noise due to registration error. The noise due to registration errors may be computed as, $$Q(x,y,z)=\max(MSE\_Residual(x,y,z)-(R+P),0)$$

where MSE_Residual(x,y,z) is the mean squared error of the output of the residual difference function 120 and P is the noise estimate for the frame from another time instance from the state buffer 150. The mean squared error calculation may be performed on a per frame, a per block, or a per pixel basis. Also, the noise estimate may be derived from the noise estimate of the current frame, derived from the noise estimate of the previous frame, or loaded from a state buffer.

The weighted temporal average function 160 receives the current frame 110 as the input image, the frame buffered image 130 of a different frame, such as the immediately preceding frame. The frame buffered image 130 may be one or more input delayed images or filtered images, as desired. The two frames are motion compensated with respect to one another so that they are aligned with one another. The output 170 of the temporal smoothing weights function 140 is used to provide a weighted average between the two frames. The output 170 provides an indication of the amount of smoothing and/or filtering to do in the image based upon the confidence in the motion estimation.

The weighted temporal average function 160 may be represented as, $$\text{Filtered}(x,y,0)=\text{Input}(x,y,0)+\text{sum}\_z(G(x,y,z)*(\text{Input}(x,y,z)-\text{Input}(x,y,0)))$$

where x and y are spatial coordinates, z defines a non-spatial coordinate, Input is the frame at the current time instance, filtered is the output of the filtering process, sum_z denotes the summation over the variable z, and G is the temporal smoothing weight. The output of the weighted temporal average function 160 is provided to the frame buffer 130 as a filtered frame. Thus, the frame buffer 130 may provide a filtered image and/or non-filtered image to the residual difference function 120, as desired.

In some embodiments, the output of the weighted temporal average function 160 may be provided to the state buffer 150 as an indicated of the filtered noise from a previous frame.

A temporal-spatial filter 180 may receive the input frame 110, and temporally filter the image based upon the output of the weighted temporal average function 160. In this manner, different parts of the image may be filtered in accordance with the motion based temporal information. The temporal-spatial filter 180 also receives information from an adjust weights to match neighborhood function 190 which provides information that is used to control the amount of spatial smoothing that is performed on an image that is based upon how much temporal smoothing was performed. In this manner, the amount of spatial smoothing is dependent on the amount of temporal smoothing being performed. The temporal-spatial filter 180 provides an image output 200.

The state buffer 150 may receive the output of the temporal smoothing weight function 140. This estimate may be computed as, $$P'(x,y,z)=P(x,y,z)-G(x,y,z)*P(x,y,z)$$

where P' is the estimate of the noise in the output frame, P is the estimate of the noise in the input frame and G is the temporal smoothing weight. Following this estimate, the array P' may be further processed. In one embodiment, the array is processed by computing the maximum value within an N×M window, where N and M are integers and greater than zero. In another embodiment, the array is further processed by computing the average value.

In another embodiment, the adjust weights to match neighborhood noise statistics function 190 may receive the output of the temporal smoothing weight function 140. The system does not use the output noise estimate directly in the control of the single frame filtering and enhancement technique. Instead, the system applies an additional processing step to map the output noise estimates to the control parameter of the single frame filtering and enhancement technique. Additional processing may include, for example, computing the maximum value of the output noise estimate within a window, computing the average value of the output noise estimate within a window, and/or computing the median value of the output noise estimate within a window.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for image processing comprising:
   (a) receiving an input image;
   (b) estimating a noise characteristic of said input image, wherein said noise characteristic includes a temporal characteristic and a spatial characteristic;
   (c) spatially filtering said input image based upon said spatial characteristic, wherein said spatial characteristic is dependent upon said temporal characteristic;
   (d) wherein said temporal characteristic is based upon a motion compensation estimation between said input image and a temporally different image;
   (e) wherein said temporally different image is a previous image of a sequence of images;
   (f) wherein said temporal characteristic is further based upon an estimate of spatial noise in said input image;
   (g) wherein said temporal characteristic is further based upon a previously filtered different image.

2. The method of claim 1 wherein said previously filtered different image is based upon a temporal characteristic measure of said previous different image.

3. The method of claim 2 wherein said previously filtered different image is maintained in a state buffer.

4. The method of claim 1 wherein a weighted temporal value is determined based upon said input image, temporally different image, and said temporal characteristic.

5. The method of claim 4 wherein said spatially filtering is different for different portions of said input image.

* * * * *